(12) United States Patent
Guvenc et al.

(10) Patent No.: US 7,574,221 B2
(45) Date of Patent: Aug. 11, 2009

(54) METHOD FOR ESTIMATING JOINTLY TIME-OF-ARRIVAL OF SIGNALS AND TERMINAL LOCATION

(75) Inventors: Ismail Guvenc, Santa Clara, CA (US); Chia-Chin Chong, Santa Clara, CA (US)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 11/832,547

(22) Filed: Aug. 1, 2007

(65) Prior Publication Data

US 2008/0032708 A1 Feb. 7, 2008

Related U.S. Application Data

(60) Provisional application No. 60/821,378, filed on Aug. 3, 2006.

(51) Int. Cl.
*H04W 24/00* (2009.01)
(52) U.S. Cl. .............. 455/456.1; 455/456.2; 455/456.5; 455/404.2
(58) Field of Classification Search .............. 455/456.1, 455/456.2, 456.5, 404.2
See application file for complete search history.

(56) References Cited

U.S. PATENT DOCUMENTS

| | | | |
|---|---|---|---|
| 6,054,950 A | | 4/2000 | Fontana |
| 6,266,014 B1 * | | 7/2001 | Fattouche et al. ........... 342/450 |
| 2003/0025631 A1 | | 2/2003 | Kim |

(Continued)

FOREIGN PATENT DOCUMENTS

EP 1 469 685 10/2004

OTHER PUBLICATIONS

I. Guvenc, Z. Sahinoglu, A. F. Molisch, and P. Orlik, "Non-coherent TOA estimation in IR-UWB systems with different signal waveforms," in *in Proc. IEEE Int. Workshop on Ultrawideband Networks (UWBNETS)*, Boston, MA, Oct. 2005, pp. 245-251, (invited paper).

(Continued)

*Primary Examiner*—Barry W Taylor
(74) *Attorney, Agent, or Firm*—Haynes and Boone, LLP

(57) ABSTRACT

A method that estimates jointly and iteratively the first arriving path of a received signal and a mobile terminal location uses a residual location error. The method may include setting a ranging threshold to reduce residual location error. The method iteratively estimates the first arriving path of the received signals and mobile terminal location, with the estimate of mobile terminal location improving the estimate of the first arriving path, and vice versa. Initially, a peak selection method determines a rough time-of-arrival (TOA) for a signal received at each of a number of different fixed terminals. An estimate of the location of the mobile unit is then provided (e.g., based on a least-squares (LS) triangulation). If the residual error is unsatisfactory, the TOAs are refined, using a search-back algorithm, which searches back from the strongest paths of the received signals. The new TOAs are used to refine the estimate of the location of the mobile terminal. In addition, the parameters of the search-back algorithm (e.g., a search-back threshold, timing windows) may be modified for greater accuracy in the estimated first path. The first arriving path estimate and the location estimate are iterated until convergence (e.g., the residuals are within a tolerance) or until a termination condition is reached, usually controlled by the thresholds setting.

13 Claims, 5 Drawing Sheets

U.S. PATENT DOCUMENTS

| | | |
|---|---|---|
| 2003/0086512 A1* | 5/2003 | Rick et al. .................. 375/343 |
| 2003/0174086 A1 | 9/2003 | Hirt |
| 2004/0127228 A1 | 7/2004 | You |
| 2005/0235499 A1 | 10/2005 | Van Deursen |
| 2006/0104387 A1 | 5/2006 | Sahinoglu |
| 2006/0125695 A1 | 6/2006 | Kennedy |
| 2006/0160545 A1* | 7/2006 | Goren et al. ............. 455/456.1 |

OTHER PUBLICATIONS

P. C. Chen, "A non-line-of-sight error mitigation algorithm in location estimation," in *Proc. IEEE Int. Conf. Wireless Commun. Networking (WCNC)*, vol. 1, New Orleans, LA, Sep. 1999, pp. 316-320.

PCT International Search Report for Int'l App. No. PCT/US 2007/075082, dated Mar. 11, 2008, 3 pages.

PCT Written Opinion of the International Searching Authority for Int'l App. No. PCT/US 2007/075082, dated Mar. 11, 2008, 3 pages.

\* cited by examiner

METHOD FOR ESTIMATING JOINTLY TIME-OF-ARRIVAL OF SIGNALS AND TERMINAL LOCATION

CROSS REFERENCE TO RELATED APPLICATIONS

The present application relates to and claims priority of U.S. Provisional Patent Application ("Provisional Application"), Ser. No. 60/821,378, entitled "Iterative Method that Jointly Estimates the Time-of-Arrival of the Received Signals and the Terminal Location," filed on Aug. 3, 2006.

The present application is also related to copending U.S. patent applications (collectively, "Related Applications") (a) Ser. No. 11/832,551, entitled "Line-of-Sight (LOS) or non-LOS (NLOS) Identification Method Using Multipath Channel Statistics," filed on the same day as the present application, and (b) Ser. No. 11/832,558, entitled "Weighted Least Square Localization Method Exploiting Multipath Channel Statistics for Non-Line-of-Sight Mitigation," filed on the same day as the present invention.

The disclosures of the Copending Provisional Application and the Related Applications are hereby incorporated by reference in their entireties.

BACKGROUND OF THE INVENTION

1. Field of the Invention

The present invention relates to wireless localization. More particularly, the present invention relates to estimating a mobile terminal's position using a mobile time-of-arrival (TOA) technique.

2. Discussion of the Related Art

Many location-based services are possible because of accurate wireless localization. Methods based on received signal strength (RSS), angle-of-arrival (AOA), time-of-arrival (TOA), and time-difference-of-arrival (TDOA) techniques are the most commonly used approaches for estimating the position of a mobile terminal.

Non-line-of-sight (NLOS) conditions significantly affect the performance of mobile localization techniques that are based on TOA. If the line-of-sight (LOS) between a mobile terminal and a base station (BS) is obstructed, a delay ("NLOS bias") is introduced into the received signal. Even a single or a few NLOS BSs may significantly degrade localization accuracy, and thus mitigation of NLOS effects is important. One way to mitigate the effects of NLOS BSs is to identify them and to exclude them from the localization operation. However, when the number of BSs available for localization is limited, it may be impossible to exclude the NLOS BSs and still meet the requirements for localization. Localization typically requires three or more BSs for a two-dimensional (2-D) localization, and a minimum of four BSs for a three-dimensional (3-D) localization.

In addition to the NLOS biases, localization inaccuracy may result from poor or imperfect estimation of the first arriving path. Typically, to estimate a TOA, a search is initiated from the strongest path and continues backwards by comparing samples against a pre-defined threshold. This search-back algorithm may lock onto an earlier or later path than the first path, and thus introduces additional biases. First-arriving-path estimation techniques are disclosed, for example, in (a) U.S. Patent Application Publication 2003/0174086, entitled "Determining a Time of Arrival of a Sent Signal," published on Sep. 18, 2003, (b) U.S. Pat. No. 6,054,950, entitled "Ultra Wideband Precision Geolocation System," issued on Apr. 25, 2000; (c) U.S. Patent Application Publication 2006/0104387, entitled "Method for estimating time of arrival of received signals for ultra wide band impulse radio systems" filed on Nov. 15, 2004; (d) U.S. Patent Application Publication 2003/0025631, entitled "First-arriving-pulse detection apparatus and associated methods", filed on Jul. 26, 2001; and in U.S. Patent Application Publication 2004/0235499, entitled "Ranging and positioning system, ranging and positioning method, and radio communications apparatus", filed on Feb. 18, 2004.

The location of a mobile terminal can also be estimated directly from the received signals. Direct estimation of the mobile terminal location is found, for example, in the article "On time-of-arrival positioning in a multipath environment", by Y. Qi and H. Kobayashi and H. Suda, published in *IEEE Trans. Vehic. Technol.*, vol. 55, no. 5, pp. 1516-1526, September 2006. Qi et al. teaches that the mobile terminal location can be estimated directly from the received multipath components, when a perfect knowledge of the channel parameters is available. Such knowledge of channel parameters is difficult to obtain in practice. Another direct estimation technique is presented in the article "Direct Position Determination of Narrowband Radio Frequency Transmitters," by A. J. Weiss, published in the *IEEE Signal Processing Lett.*, vol. 11, no. 5, pp. 513-516, May 2004. Weiss targets narrowband radio frequencies. Similarly, the article "New Direct Approaches to Robust Sound Source Localization", by Y. Rui and D. Florencio, published in *Proc. IEEE Int. Conf. on Multimedia and Expo (ICME)*, vol. 1, Baltimore, Md., July 2003, pp. 737-740, describes a direct approach for robust sound source localization. The article "Adapting the Ranging Algorithm to the Positioning Technique in UWB Sensor Networks", by L. Reggiani, M. Rydstrom, E. G. Strom, and A. Svensson, published in *Proc. 4th COST 289 Workshop*, Goteborg, Sweden, April 2007, discloses a ranging algorithm that produces several distance estimates with associated likelihoods (rather than a single distance estimate) to improve the localization algorithm. In particular, Reggiani et al. use a projections-onto-convex-sets (POCS) algorithm for localization.

Once the TOAs of the received signals at different BSs are obtained, terminal location can be estimated using a well-known algorithm, such as a least-squares (LS) algorithm or a maximum likelihood (ML) algorithm. NLOS effects adversely affect the accuracy in the estimation of mobile terminal location. Numerous techniques have been developed that mitigate NLOS effects using information from the mobile network (and ignoring channel statistics). If all the BSs are within LOS, the residual location errors are small. However, even if only a single NLOS BS is present, the residual error may increase considerably, depending on the NLOS bias. Thus, the residual error may be used to detect the presence of NLOS BSs and to mitigate their effects. U.S. Patent Application Publication 2004/0127228, entitled "Method for Correcting NLOS Error in Wireless Positioning System", filed on Dec. 30, 2002, discloses NLOS effects and mitigation techniques using the mobile communication network.

The article "A Non-Line-of-Sight Error Mitigation Algorithm in Location Estimation", by P. Chen, published in *Proc. IEEE Wireless Commun. Networking Conf. New Orleans, La.*, pp. 316-320, vol. 1, September 1999, discloses a technique for suppressing NLOS signals using the TOA information and the mobile network. The technique assumes that NLOS identification is not possible from the received multipath signal, and the number of BSs is greater than the minimum required. The article further discloses using different combinations of BSs to obtain location estimates, which are then weighted by the inverse of the corresponding residuals to obtain a final location estimate.

U.S. Patent Application Publication 2006/0125695, entitled "System and Method for Enhancing the Accuracy of a Location Estimate", published on Jun. 15, 2006, discloses a general framework for "enhancing the accuracy of a location estimate that modifies weights in a weight matrix associated with receiver station measurements in parallel with successive refinements of the location estimate". In one implementation, the weights are obtained from the residuals. Information from statistics on multipath-received signals is not used.

Numerous papers disclose techniques for NLOS identification using the statistical distribution of the TOA of the received signal. Such techniques, which typically assume that the mobile terminal is in motion, require a large number of measurements to accurately capture the necessary statistics for NLOS identification. For a static terminal, however, such techniques may not provide reliable identification, and multipath statistics of the received signal have to be used. NLOS identification using multipath received signals in a code division multiple access (CDMA) system is disclosed in European Patent Application Publication EP 1,469,685, entitled "a Method distinguishing line of sight (LOS) from non-line-of-sight (NLOS) in CDMA mobile communication system", filed on Dec. 29, 2002. In this patent application, a channel is identified as a LOS channel, if the power ratio of the maximum path to the local maximum path is greater than a predefined threshold and, simultaneously, the arrival time difference between the first path and the maximum path is less than a given time interval.

U.S. Patent Application Publication 2005/0281363, entitled "Wireless Positioning Approach Using Time Delay Estimates of Multipath Components", filed on Jun. 8, 2005, observes that, besides the first arriving signals, the second and later arriving signals, which are created due to NLOS propagation, also carry information regarding the position of interest. Therefore, all available multipath components may be processed, along with the first arriving ones, to improve localization accuracy.

Typically, triangulation in a localization operation is achieved in two independent steps; 1) TOAs are estimated from the multipath received signals corresponding to each terminal and base station link, and 2) based on the estimated TOAs, a least-square solution is obtained for mobile terminal's location. Note that, after estimation of the TOAs, information regarding the received signals is discarded, and only the TOA estimates are passed to the triangulation step. However, as stated in U.S. Patent Application Publication 2005/0281363, discussed above, the multipath components of the received signal also carry useful information regarding the LOS or NLOS characteristics of a terminal and base station link. When the à priori probability density function of NLOS induced path lengths is available, the probability density function (PDF) may be used to obtain a maximum à posteriori (MAP) estimate of mobile terminal location.

Direct location estimation techniques have either large computational complexities or high a-priori knowledge requirements. For example, the method disclosed by Qi et al., discussed above, requires knowledge of a channel impulse response (CIR) which is difficult to obtain in practice. A technique that does not require knowledge of the CIR is therefore desired.

SUMMARY OF THE INVENTION

According to one embodiment of the present invention, a method is provided for estimating the location of a mobile unit based on signals received at various fixed terminals (FT)[1]. The method jointly determines TOA for the signals received at the FT and an estimate of the location of the mobile unit. In addition, if the estimate of the location of the mobile unit is not accurate within a predetermined threshold, the method iteratively modifies the TOA, so as to repeat estimations of the location of the mobile unit, until an estimate falls within the accuracy criterion or criteria.

[1] A fixed terminal (FT) is a terminal that is not mobile. Examples of a fixed terminal include base stations in a cellular of computer network, and anchor nodes in a sensor network.

In one embodiment, the TOA are modified using a search-back algorithm. The search-back algorithm compares the signal strength of the received signal at each FT against a search-back parameter threshold. The search-back parameter threshold may depend on information derived from a determination of whether or not the signal received at the FT is LOS. The search-back parameter threshold may also depend on the predetermined threshold used in determining the accuracy of the estimate of the location of the mobile unit.

According to one embodiment of the present invention, the method uses the TOA of signals received at three or more FTs in the estimate of the location of the mobile unit. The successive estimates of the location of the mobile unit are provided using TOAs derived from different groups of FTs, each group having three or more FTs.

The present invention is better understood upon consideration of the detailed description below in conjunction with the accompanying drawings.

DETAILED DESCRIPTION OF THE PREFERRED EMBODIMENTS

Figure 1A:
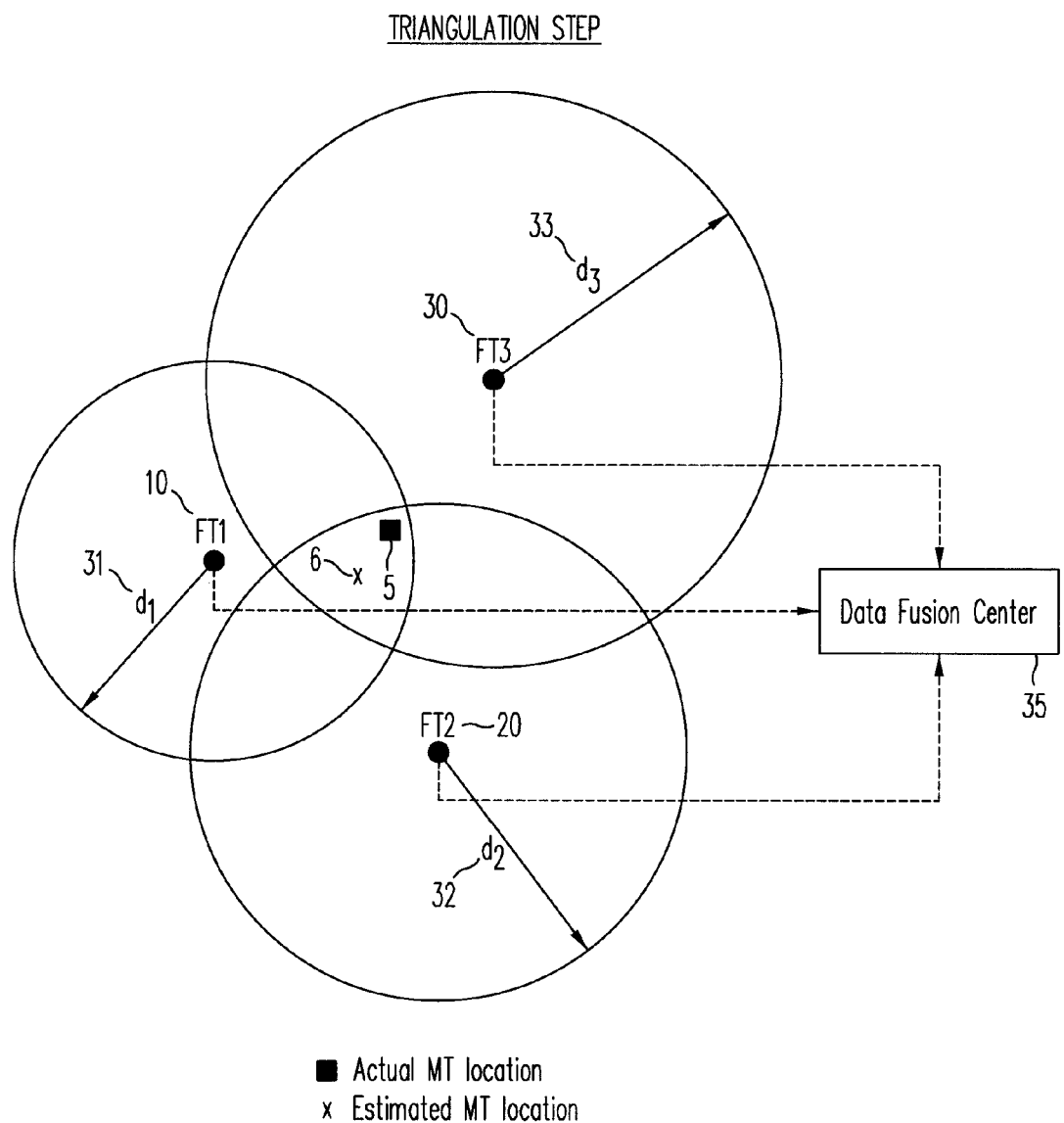
FIG. 1(a) illustrates communication system in which time-of-arrival (TOA) estimation and wireless localization operations may be performed based on signals received at different FTs under an NLOS environment.
Figure 1B:
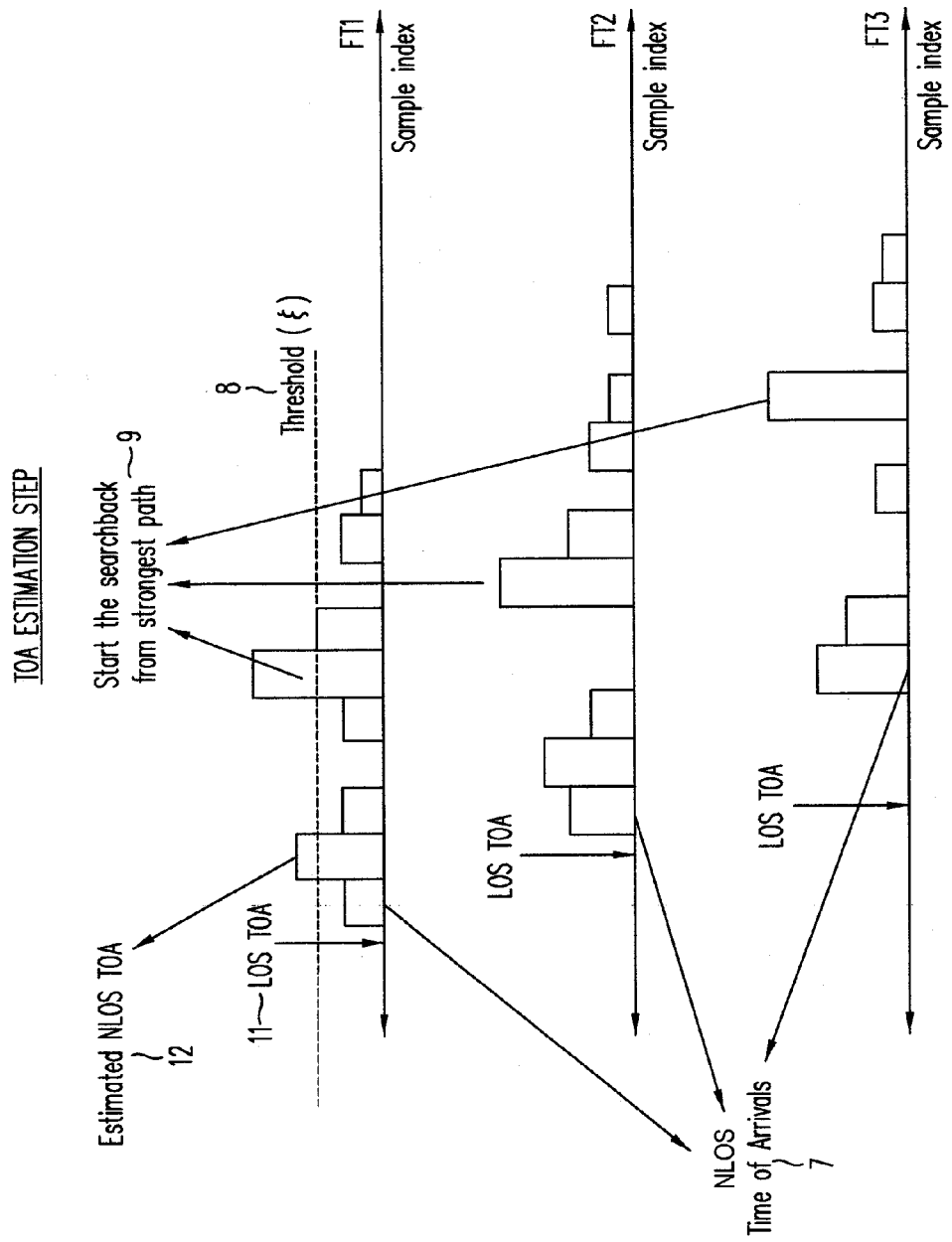
FIG. 1(b) illustrates the TOA estimation operations based on signals received at FTs 10, 20 and 30.

FIG. 1(a) illustrates communication system in which time-of-arrival (TOA) estimation and wireless localization operations may be performed based on signals received at different FTs under an NLOS environment. As shown in FIG. 1, FTs 10, 20, and 30 each measure a TOA for their respective signals received from mobile terminal 5. The TOAs are forwarded to centralized processing unit 35 to estimate a location for terminal 5 by triangulation. Alternatively, terminal 5 may estimate its location using the measurements on the received signal at the FTs.

FIG. 1(*b*) illustrates the TOA estimation operations based on signals received at FTs 10, 20 and 30. Typically, to measure a TOA, each receiver locks on the strongest path. In FIG. 1(*b*) the respective strongest paths for FTs 10, 20 and 30 are each indicated by reference numeral 9. From the strongest path identified, each receiver searches backwards in time for the first arriving path. Under a LOS condition, the first arriving path (indicated by reference numerals 11 in FIG. 1(*b*)) corresponds to the shortest distance between the transmitter and the receiver. However, under an NLOS condition (i.e., an obstruction exists between the transmitter and the receiver), the first arriving paths—indicated by reference numeral 7 in FIG. 1(*b*)—arrive later then LOS first arriving paths 11. An NLOS arriving path thus introduces a positive bias to the TOA estimate, even when the first arriving path is correctly identified. Also, a receiver typically sets a threshold value (indicated by reference numeral 8) that is used to qualify the first arriving path. When NLOS first arriving path 7 has signal strength less than the threshold value, the estimated first arriving path (indicated by reference numeral 12) has an even later value.

Figure 6:
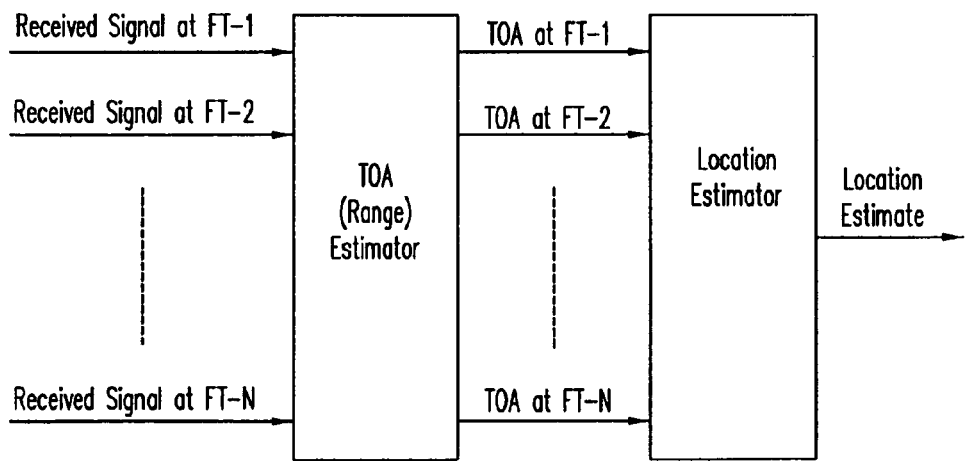
FIG. 6 shows a conventional 2-step location estimation method in which TOA estimates and the location estimate are independently derived.

In a conventional system, such as illustrated in FIG. 6, the TOA of the received signal is estimated at each FT using a ranging algorithm (e.g., a threshold-based search technique that uses arbitrary thresholds). The TOA estimates are converted to distance estimates 31, 32 and 33 (see, e.g., FIG. 1(*a*)). The range estimates using a threshold-based technique are given by $$\hat{d} = F_{ran}(\Xi, h_1, h_2, \ldots, h_N),$$

$$\Xi = [\xi_1, \xi_2, \ldots, \xi_N],$$

where $F_{ran}(.)$ is a threshold-based range-estimation algorithm that uses both predefined thresholds and the channel samples to estimate the ranges to different FTs, $\Xi$ is a vector of ranging thresholds at different FTs, $h_n$ is the vector of channel samples at the n-th FT, and $\xi_n$ is the ranging threshold used at the n-th FT. An estimate of the mobile terminal location is obtained using a localization algorithm $F_{loc}(.)$. For example, an estimate of mobile terminal location is provided by a least-squares method which selects the value of x which minimizes the sum of the squares of all residuals as follows:

$$\hat{x} = \operatorname*{argmin}_{x} \sum_{i=1}^{N} [d_i - \|x - x_i\|]^2,$$

where $d_i$ is the distance between the ith FT and mobile terminal, $x_i$ is the location of the ith FT, for the N FTs available. The mean square residual error ("residual") for the estimated terminal location can be written as $$\mathrm{Residual} = \frac{1}{N} \sum_{i=1}^{N} [d_i - \|\hat{x} - x_i\|]^2.$$

This conventional 2-step approach discards valuable information in the received signals after the TOA estimates at the FTs are measured.

Figure 7:
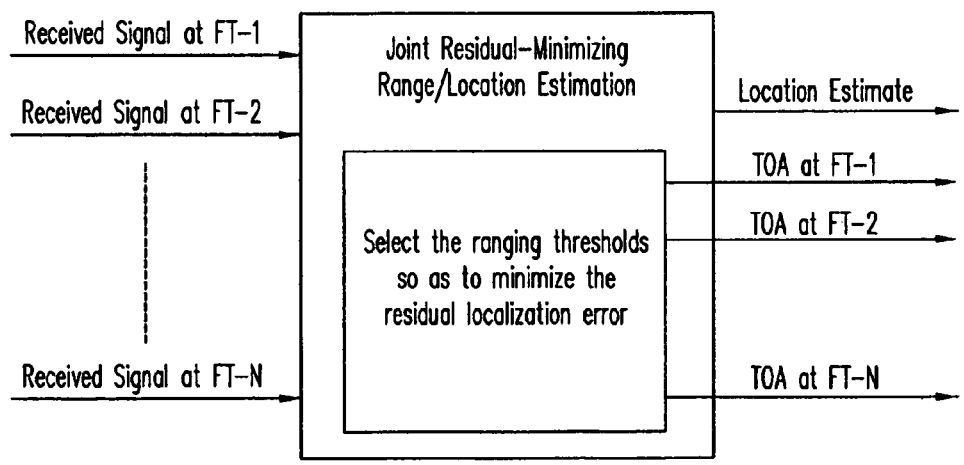
FIG. 7 shows a method that jointly estimates both the TOA at FTs and the location of a mobile terminal, according to one embodiment of the present invention.

According to one embodiment of the present invention, rather than using a two-step approach with ranging and localization stages (characterized by $F_{ran}(.)$ and $F_{loc}(.)$, respectively), a direct approach (characterized by $F_{jnt}(.)$) is provided, which jointly estimates the ranges (i.e., the TOA of signals received at FTs) and the mobile terminal location, as illustrated in FIG. 7. As illustrated in FIG. 7, ranging thresholds are selected so as to minimize the residual localization error:

$$\hat{x} = F_{jnt}(h_1, h_2, \ldots, h_N),$$

where $F_{jnt}(.)$ represents a joint ranging and localization algorithm. One joint ranging and localization technique, for example, selects ranging thresholds so as to minimize the residuals as follows:

$$\Xi = \operatorname*{argmin}_{\Xi} \Big( Res(x) \mid h_1, h_2, \ldots, h_N \Big).$$

By appropriately selecting the ranging thresholds, the residuals may be reliably minimized. If the selected threshold for an FT is too high, the first arriving path may be missed, resulting in selecting a path that arrives later than the first arriving path. Conversely, setting a threshold too low may result in capturing a noise sample, rather than the first arriving path. One method searches over representative values of the possible threshold values. Alternatively, a number of pre-defined ranging thresholds can be selected for each FT to decrease the search space.

Figure 2:
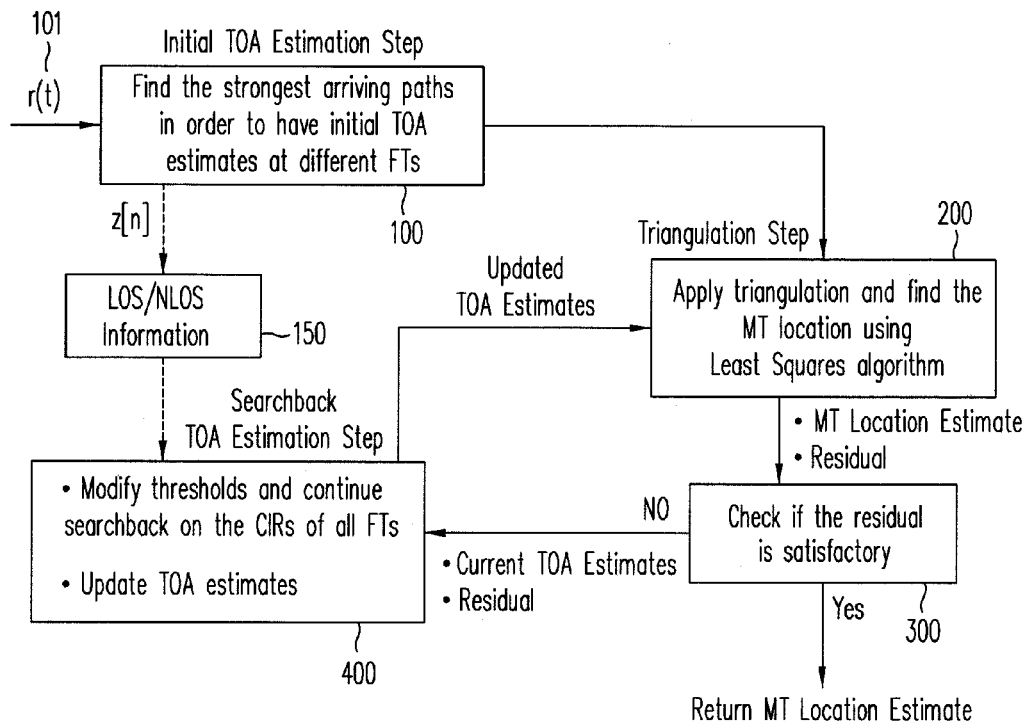
FIG. 2 is a flowchart illustrating an iterative localization algorithm, according to one embodiment of the present invention.
Figure 3:
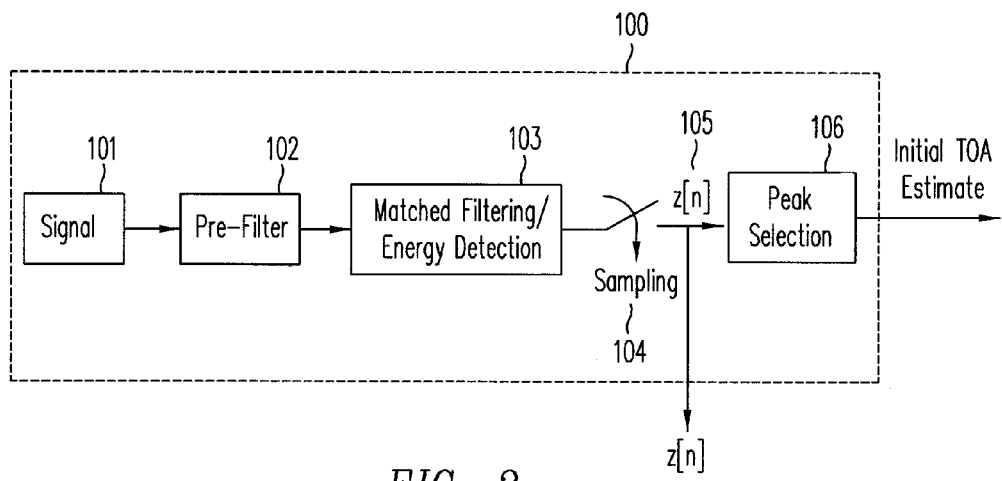
FIG. 3 is a schematic block diagram showing in greater detail selecting a strongest arriving path in step 100 of the algorithm of FIG. 2.

According to another embodiment of the present invention, an iterative method may be provided to jointly estimate both the range (i.e., the TOA) and the mobile terminal location, such as illustrated by FIG. 2. FIG. 2 is a flowchart illustrating an iterative localization algorithm, according to one embodiment of the present invention. As shown in FIG. 2, each FT obtains an initial TOA of the received signal r(t) 101 using peak selection step 100. FIG. 3 is a schematic block diagram showing in greater detail selecting a strongest arriving path in step 100 of the algorithm of FIG. 2. As shown in FIG. 3, the received signal 101 is pre-filtered at step 102. At step 103, the filtered signal may be detected using an analog front-end processing unit, such as a matched filter or an energy detector 103. The output signal of the analog front-end processing unit may be sampled at step 104 and collected, at step 105, as vector z[n]. At step 106, a peak detector circuit then selects the strongest sample to provide an initial TOA estimate of the received signal.

Figure 4:
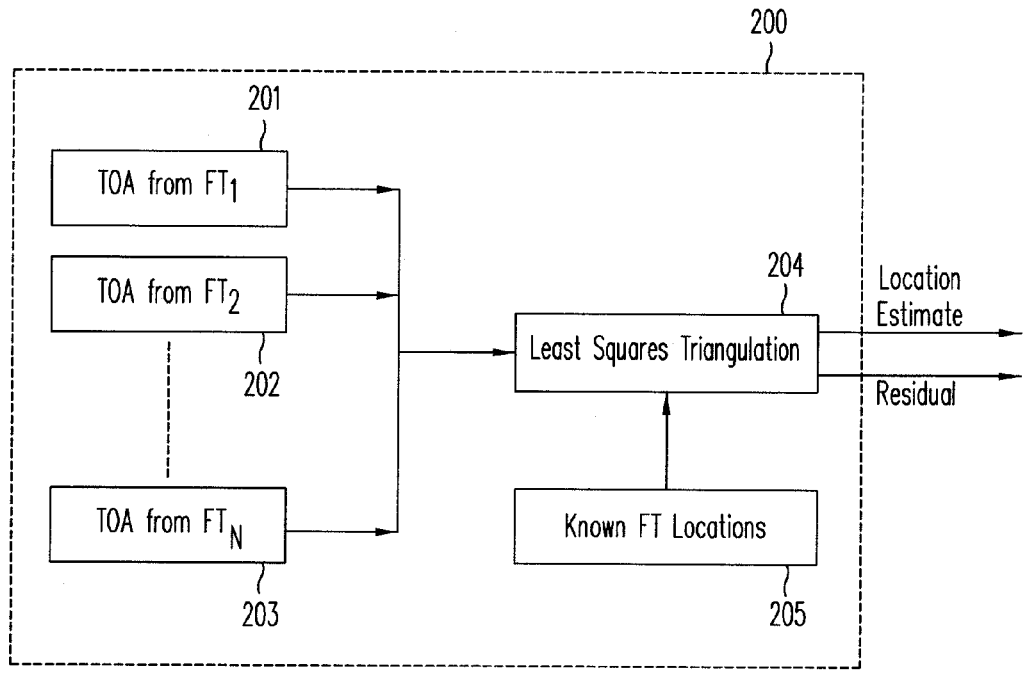
FIG. 4 is a schematic block diagram showing in greater detail triangulation step 200 in the algorithm of FIG. 2.

Referring back to FIG. 2, at step 200, the initial TOA estimates are used to estimate mobile terminal's location using least-squares, triangulation and minimization of residual techniques. FIG. 4 is a schematic block diagram showing in greater detail the triangulation step 200 in the algorithm of FIG. 2. As shown in FIG. 4, at steps 201-203, the TOA estimates from all the FTs are gathered. At step 204, a least-squares estimate of mobile terminal position is performed using the TOA estimates from the FTs and the corresponding known positions of the FTs. The residual is calculated using the estimated terminal position, as discussed above.

Figure 5:
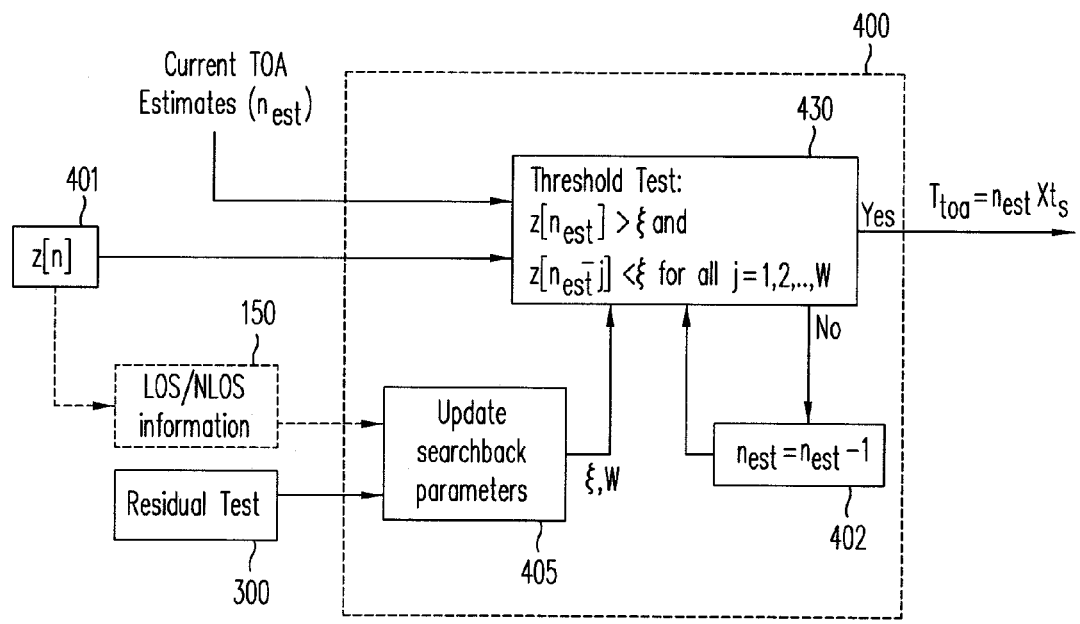
FIG. 5 is a schematic block diagram showing in greater detail the search-back algorithm in step 400 of the algorithm of FIG. 2.

Once an initial estimate of a TOA is obtained, the residual is compared with a predetermined threshold value at step 300. If the residual is sufficiently small (e.g., when all FTs are LOS, and the first arriving path is the strongest path in all of them), the algorithm terminates and the location of mobile terminal is returned. Otherwise, the TOA estimation step is repeated (step 400) at each FT. FIG. 5 is a schematic block diagram showing in greater detail the search-back algorithm in step 400 of the algorithm of FIG. 2. The search-back algorithm uses the residual information and LOS or NLOS information to estimate the TOA. (The LOS and NLOS information is collected at step 150 of FIG. 2, based on multipath received signals, as discussed above). One search-back algorithm that can be used is described in the article "Non-coherent TOA Estimation in IR-UWB Systems with Different Signal Waveforms", by I. Guvenc et al., published in *Proc. IEEE/CreateNet International Workshop on Ultrawideband Wireless Networking*, Boston, Mass., October 2005. In that algorithm, the samples prior in time to the strongest sample are searched. The samples z[n] are sampled from received signal r(t) at a sampling rate $1/t_S$. As shown in FIG. 5, at step 403, each sample z[n], n=1, . . . , W, is compared with a threshold $\xi$, beginning with z[W]. If sample value z[n] is greater than threshold $\xi$, and all the samples preceding z[n] are less than threshold $\xi$, then z[n] sample is selected as the first arriving path. The requirement that the samples preceding z[n] to be less than threshold $\xi$ captures the multi-cluster nature of some channels (e.g., UWB channels). Otherwise, the sample index is decremented (i.e., the immediately preceding sample of z[n] is next considered) and step 403 is repeated until the first arriving path is found.

When one or more FTs are NLOS, or when the search-back algorithm is not able to identify the leading edge path for all the FTs, the residual received from triangulation step 200 may be unsatisfactory. Under such circumstances, the search-back algorithm may be run after updating the parameters $\xi$ (step 405), incorporating any LOS or NLOS information obtained from the received signals. A relatively large value may be selected for the initial threshold $\xi$ to avoid any false alarms in detecting the first path. One selection for the initial threshold $\xi$ may be, for example, half the strength of the strongest path. The threshold $\xi$ may be decreased at fixed ratios for successive updates. Alternatively, threshold $\xi$ may depend on the residual error.

Using the updated TOA estimates, steps 200 and 300 are repeated. Updating the TOA estimates and computing mobile terminal location estimates (i.e., steps 200 and 300) are repeated until the residual error is sufficiently small or until a stopping rule is satisfied.

Since the mean square residual error is normalized using the number of FTs, the mean square residual error is comparable with a mean square localization error. Simulations using basic settings indicate that the mean square residual error is usually smaller than the mean square localization error for all LOS FTs. However, when any FT is NLOS, the residual error increases considerably. Thus, the required threshold for the residual can be set based on the localization accuracy desired (e.g., 1 meter).

Note that the residual may not be satisfactory even if all the first paths are correctly identified. Then, a simple stopping rule which terminates the iteration if the change in the residual is not significant can be used.

The present invention has the advantage that the position of mobile terminal is determined by interrelated TOA estimation and triangulation steps. The present invention takes advantage of the information present in both the multipath signals and the mobile network to jointly estimate the ranges and the mobile terminal location. The present invention is applicable to cellular systems, wireless local area networks, wireless sensor networks, and any other related wireless system where localization is performed. The present invention is especially applicable to ultrawideband systems where identification of the first arrival path is more error-prone than narrowband systems.

The above detailed description is provided to illustrate specific embodiments of the present invention and is not intended to be limiting. Numerous variations and modifications within the scope of the present invention are possible. The present invention is set forth in the accompanying claims.

We claim:

1. A method for jointly and iteratively estimating the location of a mobile unit based on ultra-wide band signals received at a plurality of fixed terminals and a range or time-of-arrival between the mobile unit and each of the fixed terminals, comprising:
   (a) at each fixed terminal, determining a time-of-arrival for the signal received at the fixed terminal using a time-of-arrival estimation algorithm with a variable parameter;
   (b) based on the times-of-arrival determined at the fixed terminals, providing an estimate of the location of the mobile unit; and
   (c) determining if the estimate of the location of the mobile unit is accurate within a predetermined threshold using residuals each representing an error relating the estimate of the location of the mobile unit with the known positions of the fixed terminals, such that:
   when the estimate of the location of the mobile unit is accurate within the predetermined threshold, adopting the estimate of the location of the mobile unit; and
   when the estimate of the location of the mobile unit is not accurate within the predetermined threshold, repeating determining the time-of-arrival at each fixed terminal according to (a) after modifying the parameter of the times-of-arrival estimation algorithm, thus obtaining updated time-of-arrival estimates and repeating (b) and (c) using the updated time-of-arrival estimates.

2. A method as in claim 1, wherein the times-of-arrival algorithm comprises a search-back algorithm.

3. A method as in claim 2 wherein, at each fixed terminal, the search-back algorithm selects the strongest one of a plurality of multipath components from the received signal, and compares the signal strength of the samples of the received signal preceding the selected multipath component against a search-back parameter threshold to determine a first arriving multipath component.

4. A method as in claim 3 wherein the search-back parameter threshold depends on information derived from a determination of whether or not the signal received at the fixed terminal is line-of-sight.

5. A method as in claim 3, wherein the search-back parameter threshold depends on the predetermined threshold used in determining the accuracy of the estimate of the location of the mobile unit.

6. A method as in claim 5, wherein the search-back algorithm provides a time corresponding to a given sample as the time-of-arrival when the given sample is greater than the search-back parameter threshold and all samples preceding the given sample are less than the search-back parameter threshold.

7. A method as in claim 1, wherein the times-of-arrivals of signals received at three or more fixed terminals are used in the estimate of the location of the mobile unit.

8. A method as in claim 7, successive estimates of the location of the mobile unit are provided using times-of-arrivals of different groups of fixed terminals, each group having three or more fixed terminals.

9. A method as in claim 1, wherein the time-of-arrival for the signal received at each fixed terminal is initially provided as the time-of-arrival of the strongest signal component.

10. A method as in claim 9, wherein the strongest signal component is detected using a peak detector.

11. A method as in claim 10, wherein the peak detector detects the energy in a signal output from a matched filter or an energy detector.

12. A method for estimating parameter values of a time-of-arrival estimation algorithm using ranging and localization jointly, comprising:
   (a) at each fixed terminal, determining a time-of-arrival for the signal received at the fixed terminal using the time-of-arrival estimation algorithm;
   (b) based on the times-of-arrival determined at the fixed terminals, providing an estimate of the location of the mobile unit, and determining a residual error in the estimate of the location based on known locations of the fixed terminals; and
   (c) repeating (a) and (b) for all feasible parameter values for the time-of-arrival algorithm, so as to determine the parameter values that minimize the residual error.

13. A method as in claim 12, wherein the time-of-arrival algorithm comprises a search-back algorithm and wherein each parameter value corresponds to a ranging threshold at a fixed terminal.

* * * * *